US012786741B2

(12) United States Patent
Fujinami

(10) Patent No.: US 12,786,741 B2
(45) Date of Patent: Nov. 3, 2026

(54) BASE STATION, CELL ADJUSTMENT SYSTEM, CELL ADJUSTMENT METHOD, AND NON-TRANSITORY COMPUTER READABLE MEDIUM STORING PROGRAM

(71) Applicant: NEC Corporation, Tokyo (JP)

(72) Inventor: Makoto Fujinami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 291 days.

(21) Appl. No.: 18/599,348

(22) Filed: Mar. 8, 2024

(65) Prior Publication Data

US 2024/0334199 A1 Oct. 3, 2024

(30) Foreign Application Priority Data

Mar. 27, 2023 (JP) ................................ 2023-049907

(51) Int. Cl.
*H04W 16/28* (2009.01)
*H04L 5/14* (2006.01)
(Continued)

(52) U.S. Cl.
CPC ........... *H04W 16/28* (2013.01); *H04L 5/1469* (2013.01); *H04W 52/367* (2013.01); *H04W 64/003* (2013.01)

(58) Field of Classification Search
CPC . H04W 16/28; H04W 52/367; H04W 64/003; H04L 5/1469
See application file for complete search history.

(56) References Cited

U.S. PATENT DOCUMENTS

2017/0331577 A1* 11/2017 Parkvall .................. H04W 8/18
2019/0274081 A1* 9/2019 Furuichi ....... H04W 36/008375
(Continued)

FOREIGN PATENT DOCUMENTS

JP 2004-207840 A 7/2004
JP 2019-524003 A 8/2019
(Continued)

OTHER PUBLICATIONS

JP Official Communication for JP Application No. 2023-049907, mailed on Nov. 5, 2024 with English Translation.
(Continued)

*Primary Examiner* — Mohammad S Anwar
(74) *Attorney, Agent, or Firm* — Sughrue Mion, PLLC

(57) ABSTRACT

The base station includes: a position information acquisition unit that acquires position information of the base station; a state information sharing unit that shares the position information of the base station and state information including a transmission power amount and a radio wave directivity of the base station with adjacent base stations, and acquires position information of the adjacent base station and state information of the adjacent base station; a decision unit that decides whether cell adjustment is necessary, based on position information and acquired state information of the adjacent base station, position information and acquired state information of the base station; a calculation unit that calculates a transmission power amount or a radio wave directivity of the base station when cell adjustment is necessary; and a cell adjustment unit that adjusts a cell by changing to the calculated transmission power amount or radio wave directivity.

17 Claims, 8 Drawing Sheets

(51) Int. Cl.

| | |
|---|---|
| ***H04W 52/36*** | (2009.01) |
| ***H04W 64/00*** | (2009.01) |

(56) References Cited

U.S. PATENT DOCUMENTS

| | | | | |
|---|---|---|---|---|
| 2020/0045565 | A1 | 2/2020 | Tanna et al. | |
| 2022/0201507 | A1 * | 6/2022 | Gan ...................... | H04W 92/20 |

FOREIGN PATENT DOCUMENTS

| | | | |
|---|---|---|---|
| JP | 2019-153955 | A | 9/2019 |
| JP | 2021-044677 | A | 3/2021 |
| JP | 2022-100185 | A | 7/2022 |
| WO | 2005/125249 | A1 | 12/2005 |

OTHER PUBLICATIONS

JP Office Action for Japanese Patent Application No. 2023-049907, mailed on May 21, 2024 with English Translation.

* cited by examiner

BASE STATION, CELL ADJUSTMENT SYSTEM, CELL ADJUSTMENT METHOD, AND NON-TRANSITORY COMPUTER READABLE MEDIUM STORING PROGRAM

INCORPORATION BY REFERENCE

This application is based upon and claims the benefit of priority from Japanese patent application No. 2023-049907, filed on Mar. 27, 2023, the disclosure of which is incorporated herein in its entirety by reference.

TECHNICAL FIELD

The present disclosure relates to a base station, a cell adjustment system, a cell adjustment method, and a program.

BACKGROUND ART

An autonomous cell formation method described in International Patent Publication No. WO2005/125249 includes performing transmission power control after acquiring cell setting information from a peripheral base station determined based on an address assignment rule. Further, Japanese Unexamined Patent Application Publication No. 2004-207840 discloses that a communication terminal detecting occurrence of inter-base-station interference eliminates interference by outputting acquired base station information of an interference source and position information of the terminal.

SUMMARY

A base station that can be brought to and used in a disaster-stricken area in a disaster and an event venue with a poor communication environment has been required. Further, when a plurality of base stations are used in cooperation with one another in such an environment, it is required to suppress interference with a radio wave of another base station.

The present disclosure has been made in order to solve such a problem, and an example object of the present disclosure is to provide a base station and the like being capable of suppressing interference with a radio wave of another base station.

In a first example aspect of the present disclosure, a base station includes:

- a position information acquisition unit configured to acquire position information of a base station;
- a state information sharing unit configured to directly or indirectly share the position information of the base station and state information including a transmission power amount and a radio wave directivity of the base station with one or more adjacent base stations, and also acquire position information of the adjacent base station and state information including a transmission power amount and a radio wave directivity of the adjacent base station;
- a decision unit configured to decide whether cell adjustment is necessary, based on position information of the adjacent base station, acquired state information of the adjacent base station, position information of the base station, and acquired state information of the base station;
- a calculation unit configured to calculate a transmission power amount or a radio wave directivity of the base station when it is decided that cell adjustment is necessary; and a cell adjustment unit configured to adjust a cell by changing to the calculated transmission power amount or the calculated radio wave directivity.

In a second example aspect of the present disclosure, a cell adjustment system includes:

a base station; and an adjacent base station, wherein the base station includes

- a position information acquisition unit configured to acquire position information of a base station,
- a state information sharing unit configured to directly or indirectly share the position information of the base station and state information including a transmission power amount and a radio wave directivity of the base station with an adjacent base station, and also acquire position information of the adjacent base station and state information including a transmission power amount and a radio wave directivity of the adjacent base station,
- a decision unit configured to decide whether cell adjustment is necessary, based on position information of the adjacent base station, acquired state information of the adjacent base station, position information of the base station, and acquired state information of the base station,
- a calculation unit configured to calculate a transmission power amount or a radio wave directivity of the base station when it is decided that cell adjustment is necessary, and
- a cell adjustment unit configured to adjust a cell by changing to the calculated transmission power amount or the calculated radio wave directivity, and the adjacent base station includes

- a position information acquisition unit configured to acquire position information of the adjacent base station,
- a state information sharing unit configured to directly or indirectly share the position information of the adjacent base station and state information including a transmission power amount and a radio wave directivity of the adjacent base station with the base station, and acquire position information of the base station and state information including a transmission power amount and a radio wave directivity of the base station,
- a decision unit configured to decide whether cell adjustment is necessary, based on position information of the adjacent base station, acquired state information of the adjacent base station, position information of the base station, and acquired state information of the base station,
- a calculation unit configured to calculate a transmission power amount or a radio wave directivity of the adjacent base station when it is decided that cell adjustment is necessary, and
- a cell adjustment unit configured to adjust a cell by changing to the calculated transmission power amount or the calculated radio wave directivity.

In a third example aspect of the present disclosure, a cell adjustment method includes:

- acquiring position information of a base station;
- directly or indirectly sharing the position information of the base station and state information including a transmission power amount and a radio wave directivity of the base station with one or more adjacent base stations, and acquiring position information of the adjacent base station and state information including a transmission power amount and a radio wave directivity of the adjacent base station;

deciding whether cell adjustment is necessary, based on position information of the adjacent base station, acquired state information of the adjacent base station, position information of the base station, and acquired state information of the base station;

calculating a transmission power amount or a radio wave directivity of the base station when it is decided that cell adjustment is necessary; and adjusting a cell by changing to the calculated transmission power amount or the calculated radio wave directivity.

In a fourth example aspect of the present disclosure, a program causing a computer to execute:

acquiring position information of a base station;

directly or indirectly sharing the position information of the base station and state information including a transmission power amount and a radio wave directivity of the base station with one or more adjacent base stations, and acquiring position information of the adjacent base station and state information including a transmission power amount and a radio wave directivity of the adjacent base station;

deciding whether cell adjustment is necessary, based on position information of the adjacent base station, acquired state information of the adjacent base station, position information of the base station, and acquired state information of the base station;

calculating a transmission power amount or a radio wave directivity of the base station when it is decided that cell adjustment is necessary; and adjusting a cell by changing to the calculated transmission power amount or the calculated radio wave directivity.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

First Example Embodiment

Hereinafter, an example embodiment will be described with reference to the drawings.

Figure 1:
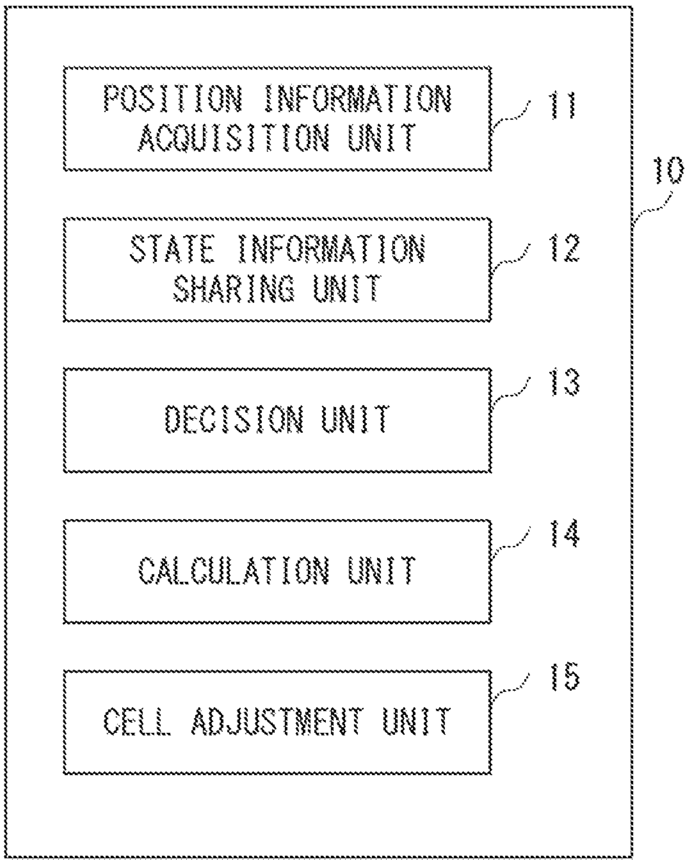
FIG. 1 is a block diagram illustrating a configuration of a base station according to a first example embodiment.

FIG. 1 is a block diagram illustrating a configuration of a base station according to a first example embodiment.

A base station 10 can operate according to any of a variety of possible cellular communication standards. The base station 10 may be an integrated-type base station including a core. Although description proceeds as that the base station 10 is an integrated-type base station including a core, similar processing is achievable even when the base station 10 is a non-built-in type. The base station 10 may be used with another base station. Even when each of a plurality of base stations is installed anywhere, each of the base stations itself automatically recognizes an installed position, transmits position information of each of the base stations to each other between the base stations, shares the position information with each other, and thereby autonomously adjusts a cell.

The base station 10 includes a processor, a memory, a communication interface, and the like. As illustrated in FIG. 1, the base station 10 includes a position information acquisition unit 11, a state information sharing unit 12, a decision unit 13, a calculation unit 14, and a cell adjustment unit 15. The position information acquisition unit 11 acquires position information of a base station. The state information sharing unit 12 directly or indirectly shares the position information of the base station and state information including a transmission power amount and a radio wave directivity of the base station with one or more adjacent base stations, and acquires position information of the adjacent base station and state information including a transmission power amount and a radio wave directivity of the adjacent base station. Note that, a method of sharing information between the base station and the adjacent base station may include transmission and reception via an external network that directly transmits and receives between the base stations, transmission and reception via a cloud (via an external server somewhere), cross-reference by accessing an external network or a cloud by each of the base station and the adjacent base station, or the like.

The decision unit 13 decides whether cell adjustment is necessary, based on position information of an adjacent base station, the acquired state information of the adjacent base station, the position information of the base station, and the acquired state information of the base station. When it is decided that the cell adjustment is necessary, the calculation unit 14 calculates a transmission power amount or a radio wave directivity of the base station. The cell adjustment unit 15 adjusts a cell by changing to the calculated transmission power amount or the calculated radio wave directivity.

Figure 2:
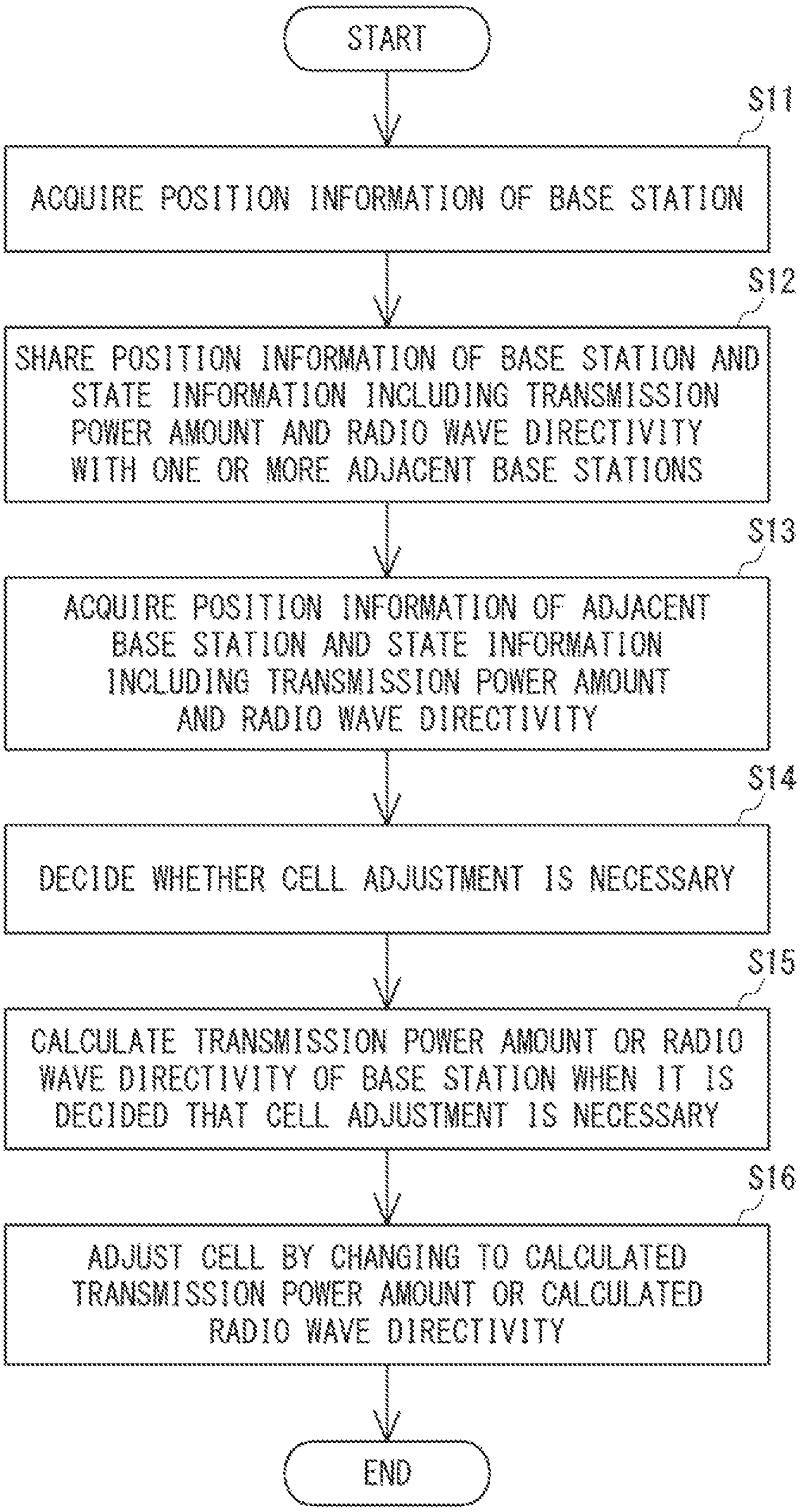
FIG. 2 is a flowchart illustrating a cell adjustment method according to the first example embodiment.

FIG. 2 is a flowchart illustrating a cell adjustment method according to the first example embodiment.

The position information acquisition unit 11 acquires position information of a base station (step S11). The state information sharing unit 12 directly or indirectly shares the position information of the base station and state information including a transmission power amount and a radio wave directivity of the base station with one or more adjacent base stations (step S12). Further, the state information sharing unit 12 acquires position information of the adjacent base station and state information including a transmission power amount and a radio wave directivity of the adjacent base station (step S13).

The decision unit 13 decides whether cell adjustment is necessary, based on the position information of the adjacent base station, the acquired state information of the adjacent base station, the position information of the base station, and the acquired state information of the base station (step S14). When it is decided that the cell adjustment is necessary, the calculation unit 14 calculates a transmission power amount or a radio wave directivity of the base station (step S15). The cell adjustment unit 15 adjusts a cell by changing to the calculated transmission power amount or the calculated radio wave directivity (step S16).

According to the first example embodiment described above, it is possible to provide a base station, a cell adjustment method, and the like being capable of suppressing interference with a radio wave of another base station.

Second Example Embodiment

Figure 3:
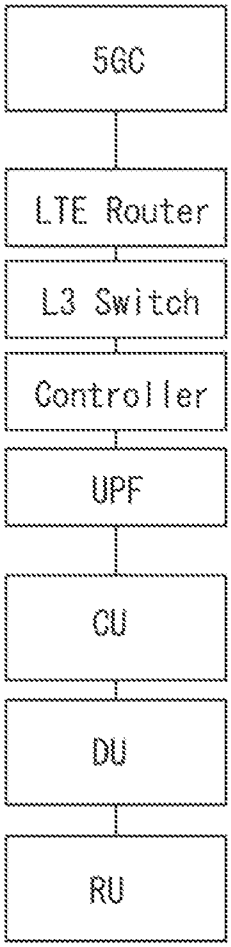
FIG. 3 is a block diagram illustrating a configuration of a general base station.

FIG. 3 is a block diagram illustrating a configuration of a general base station.

In a general base station configuration, as illustrated in FIG. 3, a core (5GC) and a base station are separated with each other. The core is communicably connected to a plurality of base stations and the like in a one-to-many relationship. Even when a communication terminal wirelessly connected to each base station moves between a plurality of base stations, the core can perform processing (handover processing) of switching a base station or the like to be communicated, or the like.

The 5GC is generally located in a cloud, and includes an AMF and an SMF both performing a C-plane function, and a user plane function (UPF) being located on-premise. The UPF provides a function being specific to U-plane processing of transferring packet data of user data. The base station includes a radio unit (RU), a distributed unit (DU), and a central unit (CU). In some example embodiments, each of the radio unit (RU), the distributed unit (DU), and the central unit (CU) may be a separate server.

The RU is an antenna portion of the base station, transmits and receives a radio wave to and from a user equipment (UE), and communicates with the DU. The DU is also referred to as a slave station, and mainly performs modulation and demodulation (conversion between analog and digital) of a signal and retransmission of a missing signal. The CU performs control of a plurality of DUs and control of radio resource control (RRC) being a communication protocol between the UE and the base station.

Figure 4:
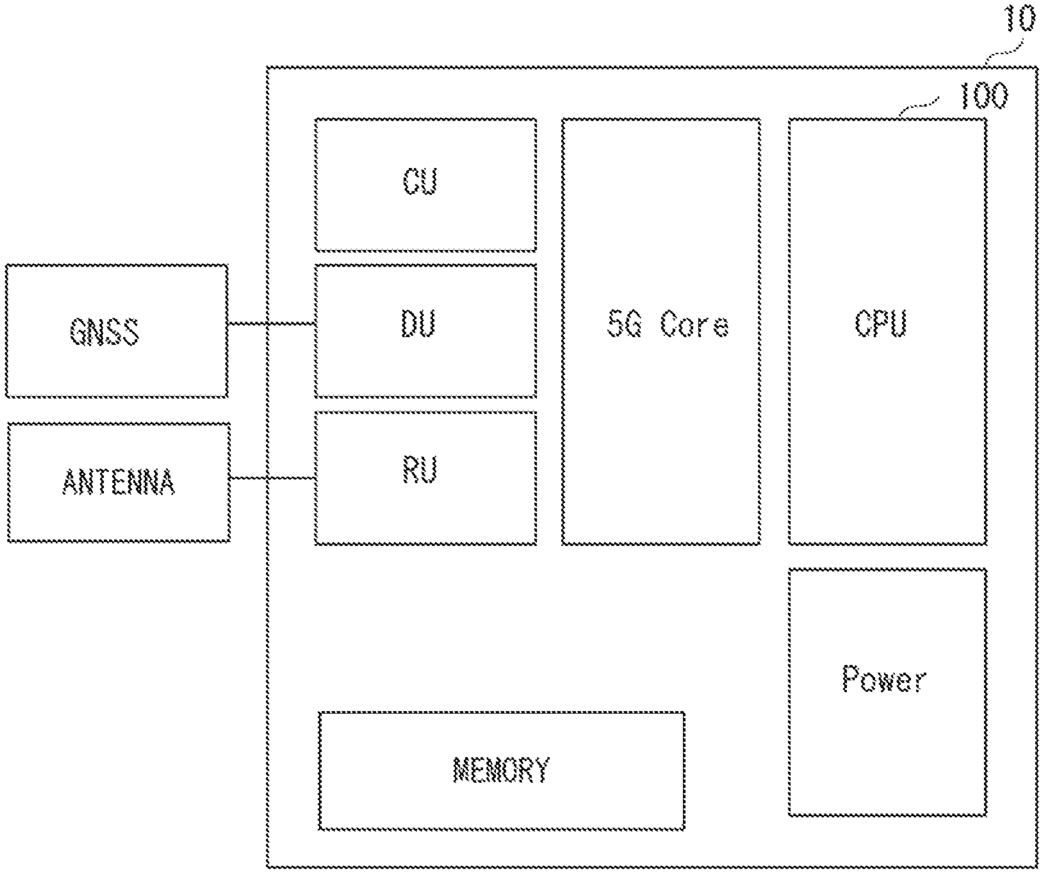
FIG. 4 is a block diagram illustrating a configuration of an integrated-type base station according to a second example embodiment.

FIG. 4 is a block diagram illustrating a configuration of an integrated-type base station according to a second example embodiment of the present disclosure.

When being used in the present specification, the integrated-type base station refers to a base station with a 5G core network (5GC). For example, the base station may be a 3GPP (registered trademark) 5G NR gNB, but is not limited thereto. A base station may be able to operate according to any of a variety of other possible cellular communication standards. In some example embodiments, an integrated-type base station 10 may include an application server.

In the integrated-type base station 10 incorporating a core function according to the second example embodiment of the present disclosure, the 5GC includes a UPF. Hereinafter, the 5GC including the UPF will be described as a core. Note that, whether a UPF function is actually performed depends on an operating environment of a base station, and in some example embodiments, the UPF function may not be performed. The integrated-type base station 10 includes a radio unit (RU), a distributed unit (DU), and a central unit (CU). In FIG. 4, the RU is connected to an antenna (an RF antenna, a radio antenna). Further, the DU is connected to a global navigation satellite systems (GNSS) receiver. Further, the base station 10 also includes a processor such as a central processing unit (CPU), a memory, an antenna having a directivity, a power supply such as a battery, and the like.

The processor reads and executes software (a computer program) from the memory, and thereby performs processing of the base station 10 and the like described by using a flowchart in the example embodiment. The processor may be, for example, a microprocessor, a micro processing unit (MPU), or a central processing unit (CPU). The processor may include a plurality of processors.

The memory is configured by a combination of a volatile memory and a non-volatile memory. The memory may include a storage located away from the processor. In this case, the processor may access the memory via a not-illustrated I/O interface.

Since the integrated-type base station 10 of the present disclosure is a base station being provided with a core network (CN) including the UPF that bears a U-plane, one 5G communication network can be established across a plurality of base stations when inter-base-station communication (or inter-core communication) can be achieved. The inter-base-station communication may be not only direct transmission and reception between base stations, but also transmission and reception via an external network or transmission and reception via a cloud. Each base station may access the cloud and perform cross-reference. Further, the integrated-type base station 10 includes the UPF function. When executing the UPF function, the integrated-type base station 10 functions as a base station being capable of performing both a C-plane and U-plane functions. Since the 5G communication is broadband communication (having higher communication speed), higher CPU processing performance is required for the U-plane function than that of an existing base station.

Figure 5:
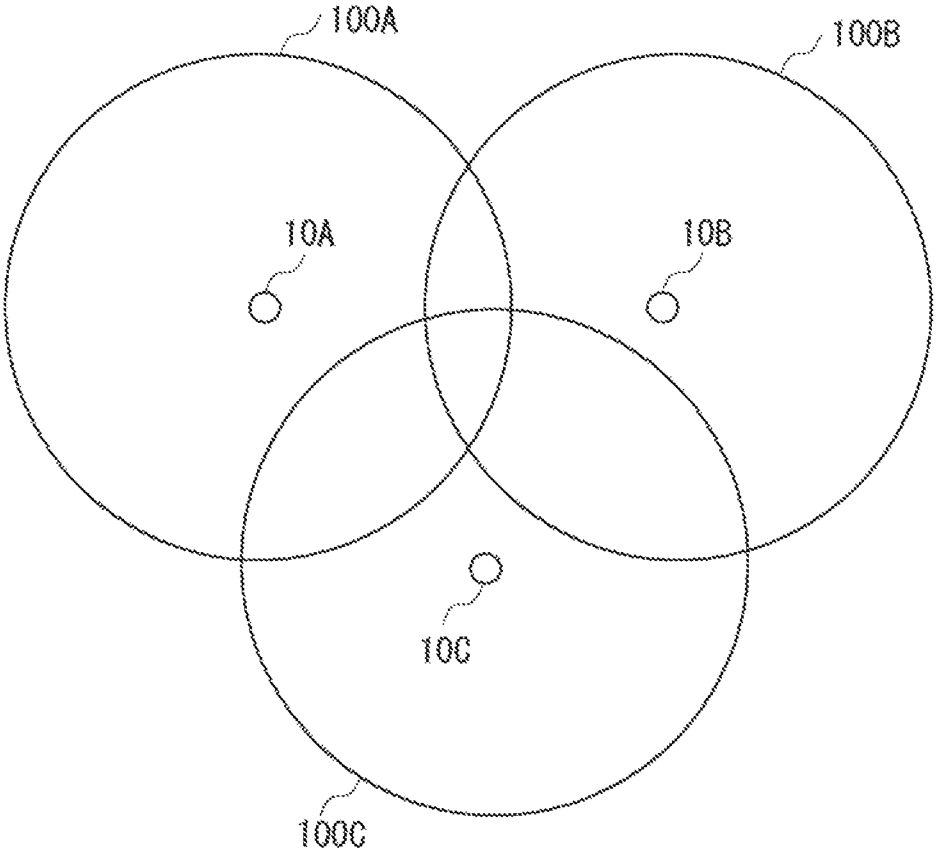
FIG. 5 is a diagram describing an example of using a plurality of base stations according to the second example embodiment.

FIG. 5 is a top view describing an example of using a plurality of integrated-type base stations.

The above-described integrated-type base station 10 can be accommodated in a single housing and can be carried, and thus can be brought to and used in a disaster-stricken area in a disaster even when there is no carrier line, as long as there is a power supply. Thus, the integrated-type base station 10 is also referred to as a hand-carried type base station. In that case, as illustrated in FIG. 5, a plurality of integrated-type base stations (10A, 10B, and 10C in FIG. 5) can be used in cooperation with each other in order to secure coverage areas having a wide range (100A, 100B, and 100C in FIG. 5). As a result, for example, a communication apparatus 20A can communicate with a communication apparatus 20B via the base station 10A and the base station 10B.

In the example illustrated in FIG. 5, since each integrated-type base station uses an antenna having no directivity, the base station emits a radio wave uniformly in all directions (as illustrated in FIG. 5, it can be a coverage area having a substantially circular shape). Normally, by performing precise calculation before the base station is installed, it is possible to set a coverage area to which a radio wave of each base station reaches in such a way as not to almost overlap with each other. Further, regarding an installation position (e.g., longitude, latitude, and the like) of the base station and a setting condition (e.g., maximum transmission power, and the like), it may be necessary to apply to the Ministry of Internal Affairs and Communications or the like in advance and acquire permission. However, there is case where it is not possible to accurately calculate and set a coverage area, transmission power, an orientation of an antenna, and the like in advance, as in a case where the above-described hand-carried type base station is used in a disaster.

Therefore, in the present disclosure, a method in which, even when each of a plurality of base stations is installed anywhere, each of the base station itself automatically recognizes an installed position, transmits position information of each of the base stations to each other between the base stations, shares the position information with each other, and thereby autonomously adjusts transmission power and an orientation of an antenna and adjusts a coverage area is proposed.

Currently, both a carrier 5G and a local 5G adopt time division duplex (TDD) that inverts a communication direction at each very short time. In order to achieve switching of the communication direction of an uplink (UL) signal and a downlink (DL) signal, and to satisfy a synchronization requirement, it is required to calculate an accurate time at each location, based on a GPS signal acquired from an atomic clock and a satellite antenna mounted on a GPS satellite. Thus, a base station for the carrier 5G and the local 5G includes a positioning function equivalent to a GPS receiver. Examples of a satellite positioning system include a global positioning system (GPS), and global navigation satellite systems (GNSS), but are not limited thereto. Therefore, the base station according to the present disclosure uses the position acquisition function based on a positioning signal from the satellite positioning system, and after each base station acquires position information, each of the base stations shares the position information with each other in advance through the inter-base-station communication. The inter-base-station communication may be performed at each very short time.

Figure 6:
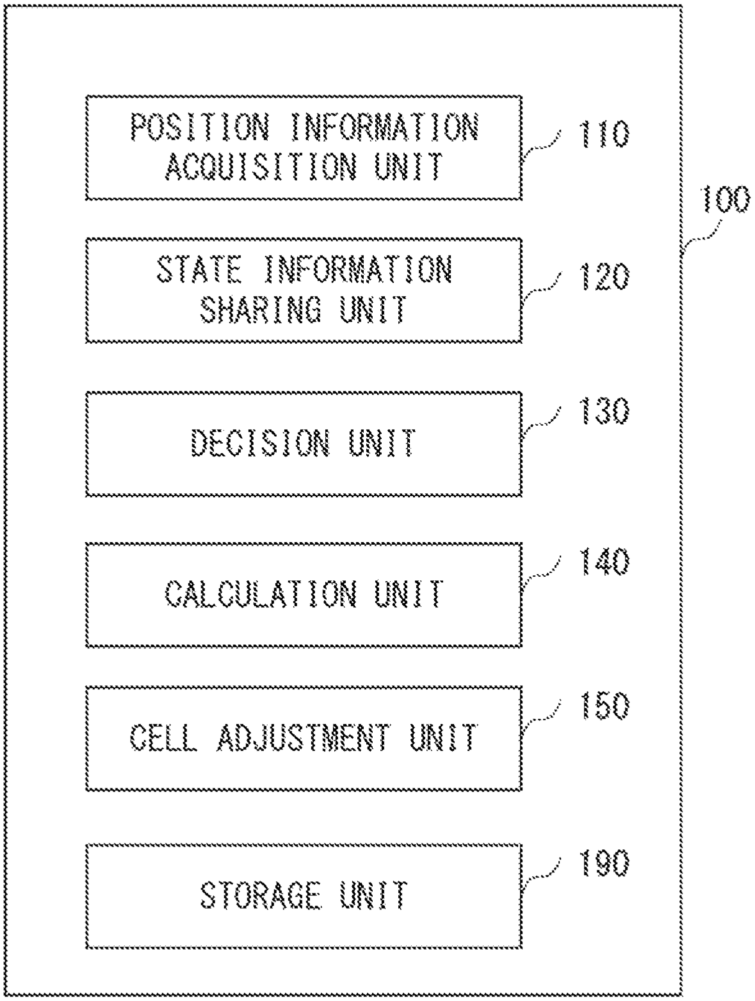
FIG. 6 is a diagram illustrating functional blocks of a control unit of the base station according to the second example embodiment.

FIG. 6 is a diagram illustrating functional blocks of a control unit of a base station.

A control unit 100 includes a position information acquisition unit 110, a state information sharing unit 120, a decision unit 130, a calculation unit 140, a cell adjustment unit 150, and a storage unit 190. The control unit 100 functions as a functional arithmetic unit that executes each of these pieces of subdivided processing by executing a program.

The position information acquisition unit 110 acquires position information of a base station. The position information acquisition unit 110 can acquire position information (e.g., longitude, latitude, and the like) of the base station 10A by using the GNSS receiver. The position information acquisition unit 110 may measure a position of the base station itself, based on a reception signal from the satellite positioning system after a power supply of the base station is activated. Position information acquisition may be performed at each very short time.

The state information sharing unit 120 directly transmits the acquired position information of the base station and state information of a radio wave including a transmission power amount and a radio wave directivity of the base station to the adjacent base station 10B and the adjacent base station 10C by the inter-base-station communication. In some example embodiments, for example, the transmit power amount may be a maximum transmit power amount. The radio wave directivity may indicate that a radio wave has no directivity. In another example embodiment, there may be a case where an initial transmit power amount is a relatively small transmit power, and the transmit power is gradually increased until another base station being adjacent can be recognized or the maximum transmit power amount is reached.

Further, the state information sharing unit 120 directly acquires, from the adjacent base station 10B, the position information of the adjacent base station 10B, and the state information including the transmission power amount and the radio wave directivity of the adjacent base station 10B. The state information sharing unit 120 directly acquires, from the adjacent base station 10C, the position information of the adjacent base station 10C, and the state information including the transmission power amount and the radio wave directivity of the adjacent base station 10C. In another example embodiment, the state information may also include a situation of a UPF processing load in the base station, the number of terminals to be accommodated, and a communication amount inferred from connection destination information of an accommodating terminal.

The state information sharing unit 120 of each base station performs broadcast transmission, to the adjacent base station, on measured position information, and the state information including an initial transmission power amount and an initial radio wave directivity together with an identifier (ID) of the base station itself. Broadcast transmission refers to simultaneous transmission of information of the same content to a large number of parties. As a result, each base station can acquire the position information and the state information including the initial transmission power amount and the initial radio wave directivity of the adjacent base station. The position information and the state information of the adjacent base station are stored in the storage unit 190 of each base station. Note that, sharing of the position information and the state information may be performed at each very short time. An integrated access backhaul (IAB) with inter-base-station multi-hop can be used for sharing the position information and the status information. Further, in some example embodiments, a communication path can be established between the base stations by connecting the base stations to each other via a wired network. In another example embodiment, a method of sharing information between the base station and the adjacent base station may be transmission and reception of information via the Internet or an external network, or cross-reference by accessing the cloud via the Internet or an external network. Note that, the state information sharing unit 120 can also use a random backoff algorithm in a wireless LAN in order to avoid a collision at a time of broadcast. The random backoff algorithm is an algorithm that determines a random time to wait before starting data transmission in order to avoid a collision by shifting timing of starting the data transmission.

The decision unit 130 decides whether cell adjustment is necessary, based on the acquired position information of the adjacent base station, the acquired state information of the adjacent base station, the acquired position information of the base station, and the acquired state information of the base station.

Specifically, the decision unit 130 calculates a cell size and a coverage area of the adjacent base station, based on the acquired state information of the adjacent base station, and calculates a cell size and a coverage area of the base station, based on the acquired state information of the base station.

Furthermore, the decision unit 130 can decide whether cells of each of the adjacent base station and the base station overlap with each other, based on the position information of the adjacent base station and the position information of the base station. The decision unit 130 can decide that radio wave interference may occur when an overlapping region of the cells is equal to or larger than a threshold value, and decide that the cell adjustment is necessary.

When the decision unit 130 decides that the cell adjustment is necessary, the calculation unit 140 calculates at least one of the transmission power amount and the radio wave directivity of the base station by using a cell adjustment algorithm. Herein, the calculation unit 140 of the base station 10A calculates the transmission power amount or the radio wave directivity of the base station, based on the same cell adjustment algorithm as that of the calculation unit 140 of the adjacent base station 10B. The cell adjustment algorithm may be stored in the storage unit 190 of each base station in advance, or may be performed broadcast transmission to the adjacent base station and shared together with the state information by the state information sharing unit 120. In some example embodiments, the calculation unit 140 may calculate a distance length between the base station and the adjacent base station, based on the acquired position information of the base station and the acquired position information of the adjacent base station.

The cell adjustment unit 150 adjusts a cell by changing to the calculated transmission power amount or the calculated radio wave directivity.

Figure 7:
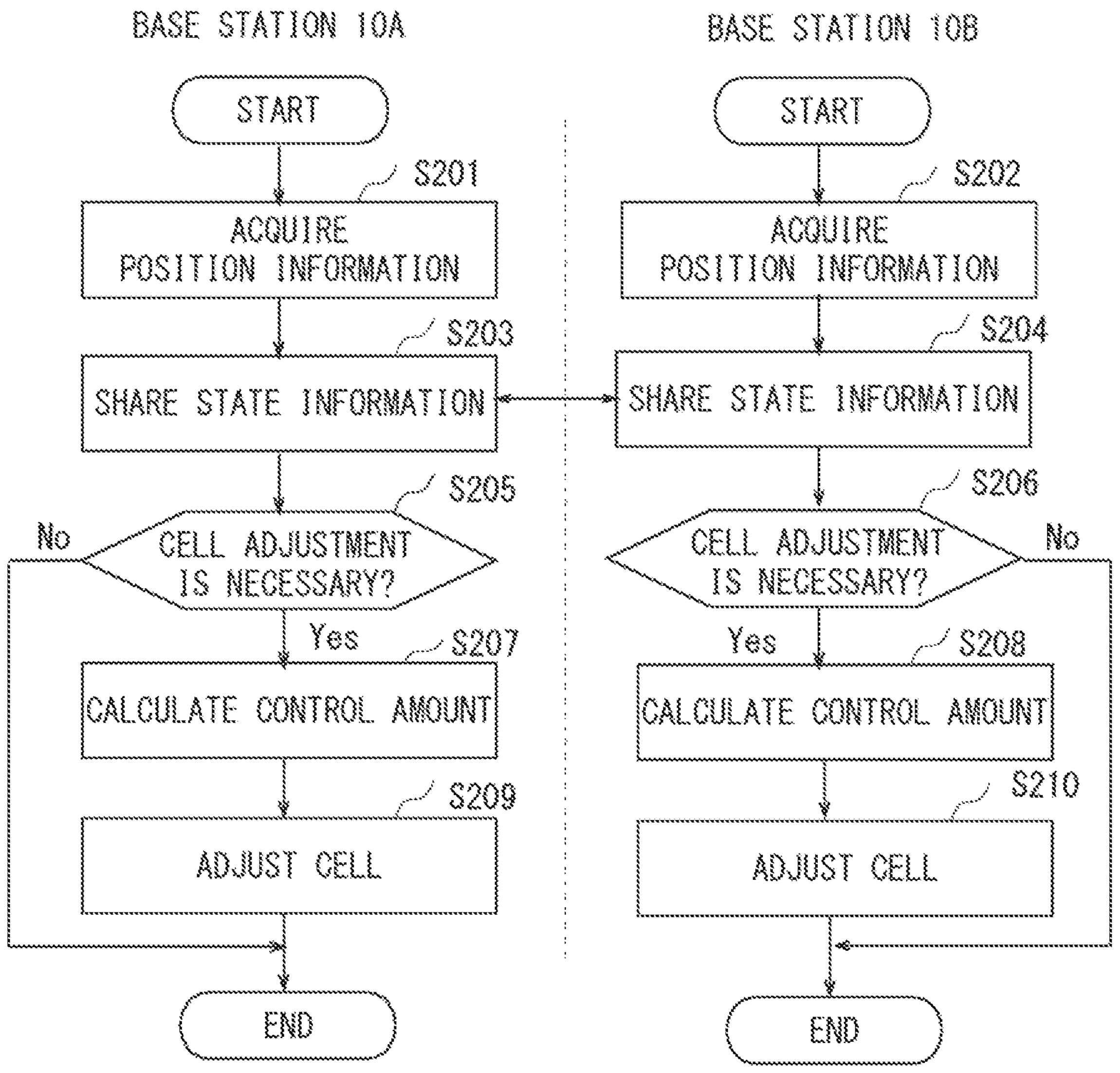
FIG. 7 is a flowchart illustrating a cell adjustment method according to the second example embodiment.

FIG. 7 is a diagram describing a cell adjustment method.

The base station 10A is arranged in any area, and the power supply is activated. Similarly, the base station 10B is arranged in any area being different from and adjacent to the base station 10A, and the power supply is activated.

The base station 10A acquires position information (e.g., longitude, latitude, and the like) of the base station 10A by using the GNSS receiver (step S201). Similarly, the base station 10B acquires position information (e.g., longitude, latitude, and the like) of the base station 10B by using the GNSS receiver (step S202).

The base station 10A acquires state information of a current radio wave, performs broadcast transmission, to the base station 10B, on the acquired state information together with the position information of the base station 10A described above, and shares the information (step S203). The base station 10B acquires state information of the current radio wave, performs broadcast transmission, to the base station 10A, on the acquired state information together with the position information of the base station 10B described above, and shares the information (step S204).

The base station 10A decides whether cell adjustment is necessary (step S205). Specifically, the decision unit 130 of base station 10A calculates a cell size and a coverage area of the adjacent base station 10B, based on the acquired state information of the adjacent base station, and calculates a cell size and a coverage area of the base station, based on the acquired state information of the base station 10A. Furthermore, the decision unit 130 decides whether cells of each of the adjacent base station and the base station overlap with each other, based on the position information of the adjacent base station and the position information of the base station. Similarly, the base station 10B decides whether cell adjustment is necessary (step S206).

When the cell adjustment is necessary (Yes in step S205), the base station 10A calculates a transmission power amount and a radio wave directivity in such a way as to suppress interference with a radio wave of the base station 10B (step S207). Similarly, when cell adjustment is necessary (Yes in step S206), the base station 10B calculates the transmission power amount and the radio wave directivity in such a way as to suppress interference with a radio wave of the base station 10A (step S208). At this time, each of the base station 10A and the base station 10B calculates the transmission power amount and the radio wave directivity to be adjusted by using the same cell adjustment algorithm.

Figure 8:
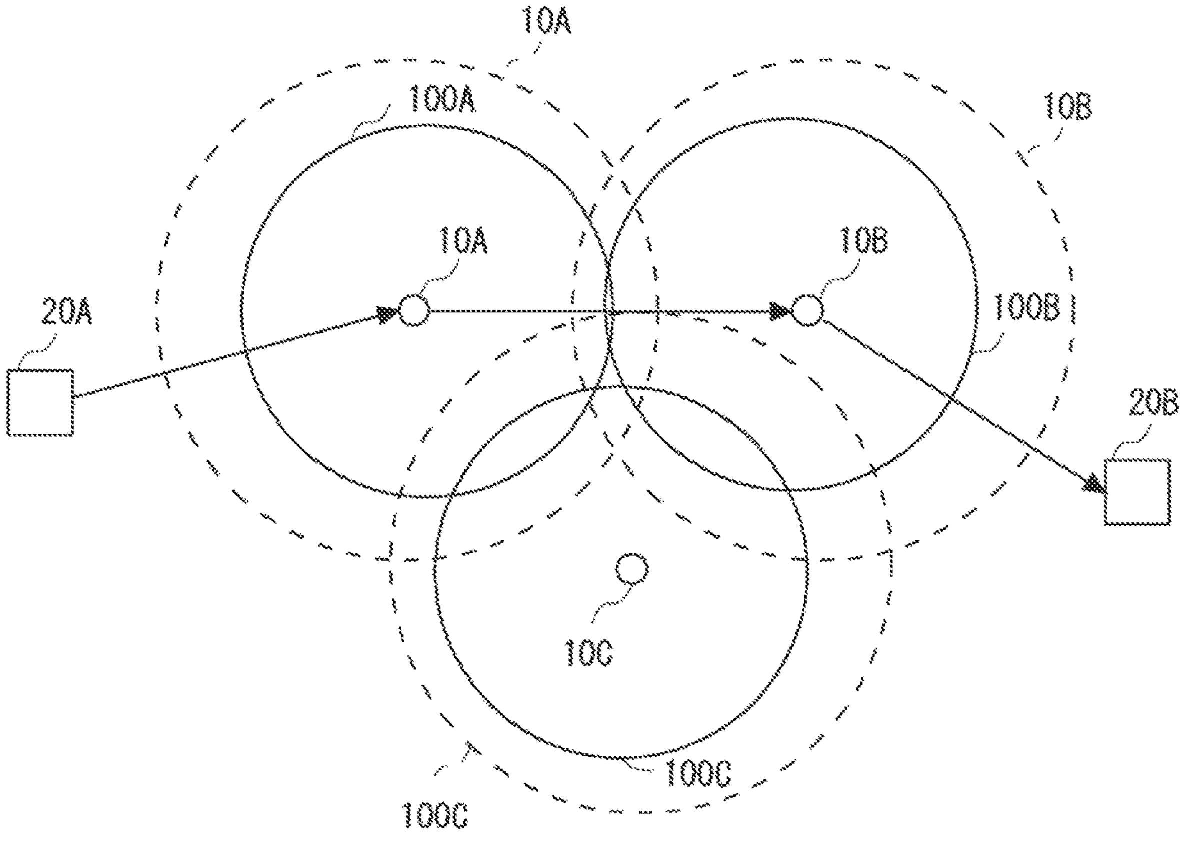
FIG. 8 is a diagram describing cell adjustment in each base station according to the second example embodiment.

Finally, the base station 10A changes to the calculated transmission power amount and the calculated radio wave directivity, and thereby performs the cell adjustment (step S209). The base station 10B changes to the calculated transmission power amount and the calculated radio wave directivity, and thereby performs the cell adjustment (step S210). As a result, the cell size can be attenuated to an extent that interference does not occur, as illustrated from a state before the adjustment of the transmission power (100A to 100C in a broken line in FIG. 8) to a state after the adjustment (100A to 100C in a solid line in FIG. 8). Further, in some example embodiments, the cell can also be adjusted by changing the radio wave directivity (e.g., a cell having an elliptical shape) without changing the transmit power amount. A known beamforming technique can be used to change the radio wave directivity.

In some example embodiments, a cell adjustment system includes a base station and an adjacent base station. The base station includes: a position information acquisition unit that acquires position information of the base station; a state information sharing unit that directly or indirectly shares the position information of the base station and state information including a transmission power amount and a radio wave directivity of the base station with an adjacent base station, and also acquires position information of the adjacent base station and state information including a transmission power amount and a radio wave directivity of the adjacent base station; a decision unit that decides whether cell adjustment is necessary, based on position information of the adjacent base station, the acquired state information of the adjacent base station, position information of the base station, and the acquired state information of the base station; a calculation unit that calculates a transmission power amount or a radio wave directivity of the base station when it is decided that cell adjustment is necessary; and a cell adjustment unit that adjusts a cell by changing to the calculated transmission power amount or the calculated radio wave directivity. Further, the adjacent base station includes: a position information acquisition unit that acquires position information of the adjacent base station; a state information sharing unit that directly or indirectly shares the position information of the adjacent base station and state information including a transmission power amount and a radio wave directivity of the adjacent base station with the base station, and also acquires position information of the base station and state information including a transmission power amount and a radio wave directivity of the base station; a decision unit that decides whether cell adjustment is necessary, based on position information of the adjacent base station, the acquired state information of the adjacent base station, position information of the base station, and the acquired state information of the base station; a calculation unit that calculates a transmission power amount or a radio wave directivity of the adjacent base station when it is decided that cell adjustment is necessary; and a cell adjustment unit that adjusts a cell by changing to the calculated transmission power amount or the calculated radio wave directivity.

As described above, in the cell adjustment system, a mobile base station can autonomously adjust a cell diameter, and thereby it is possible to prevent interference of a radio wave when a plurality of base stations are used.

In the examples described above, a program includes an instruction group (or software code) that, when loaded into a computer, causes a computer to perform one or more of the functions described in the example embodiments. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that, the present disclosure is not limited to the above-described example embodiments, and can be appropriately modified without departing from the spirit. The plurality of examples described above may be implemented in combination as appropriate.

Some or all of the above-described example embodiments may also be described as the following supplementary notes, but are not limited thereto.

(Supplementary Note 1)

A base station including:

- a position information acquisition unit configured to acquire position information of a base station;
- a state information sharing unit configured to directly or indirectly share the position information of the base station and state information including a transmission power amount and a radio wave directivity of the base station with one or more adjacent base stations, and acquire position information of the adjacent base station and state information including a transmission power amount and a radio wave directivity of the adjacent base station;
- a decision unit configured to decide whether cell adjustment is necessary, based on position information of the adjacent base station, acquired state information of the adjacent base station, position information of the base station, and acquired state information of the base station;
- a calculation unit configured to calculate a transmission power amount or a radio wave directivity of the base station when it is decided that cell adjustment is necessary; and
- a cell adjustment unit configured to adjust a cell by changing to the calculated transmission power amount or the calculated radio wave directivity.

(Supplementary Note 2)

The base station according to supplementary note 1, wherein

- the base station adopts time division duplex (TDD), and includes a receiver configured to receive a positioning signal from a satellite positioning system, and
- the position information acquisition unit acquires position information of the base station based on a positioning signal received via the receiver.

(Supplementary Note 3)

The base station according to supplementary note 2, wherein the state information sharing unit transmits, to one or more adjacent base stations by broadcast, state information of the base station together with an identifier of the base station, and acquires, from the adjacent base station by broadcast, state information of the adjacent base station together with an identifier of the adjacent base station.

(Supplementary Note 4)

The base station according to supplementary note 3, wherein the state information sharing unit uses a random backoff algorithm.

(Supplementary Note 5)

The base station according to supplementary note 1, wherein the calculation unit calculates a distance length between the base station and the adjacent base station, based on acquired position information of the base station and acquired position information of the adjacent base station.

(Supplementary Note 6)

The base station according to supplementary note 1, further including a core, a radio unit (RU), a distributed unit (DU), and a central unit (CU),

- wherein the base station is a mobile base station operating according to a cellular communication standard.

(Supplementary Note 7)

The base station according to supplementary note 1, wherein the calculation unit calculates a transmission power amount or a radio wave directivity of the base station by using the same cell adjustment algorithm as that of the adjacent base station.

(Supplementary Note 8)

A cell adjustment system including:

a base station; and an adjacent base station, wherein the base station includes

- a position information acquisition unit configured to acquire position information of a base station,
- a state information sharing unit configured to directly or indirectly share the position information of the base station and state information including a transmission power amount and a radio wave directivity of the base station with an adjacent base station, and acquire position information of the adjacent base station and state information including a transmission power amount and a radio wave directivity of the adjacent base station,
- a decision unit configured to decide whether cell adjustment is necessary, based on position information of the adjacent base station, acquired state information of the adjacent base station, position information of the base station, and acquired state information of the base station,
- a calculation unit configured to calculate a transmission power amount or a radio wave directivity of the base station when it is decided that cell adjustment is necessary, and
- a cell adjustment unit configured to adjust a cell by changing to the calculated transmission power amount or the calculated radio wave directivity, and the adjacent base station includes

- a position information acquisition unit configured to acquire position information of the adjacent base station,
- a state information sharing unit configured to directly or indirectly share the position information of the adjacent base station and state information including a transmission power amount and a radio wave directivity of the adjacent base station with the base station, and acquire position information of the base station and state information including a transmission power amount and a radio wave directivity of the base station,
- a decision unit configured to decide whether cell adjustment is necessary, based on position information of the adjacent base station, acquired state information of the adjacent base station, position information of the base station, and acquired state information of the base station, a calculation unit configured to calculate a transmission power amount or a radio wave directivity of the adjacent base station when it is decided that cell adjustment is necessary, and a cell adjustment unit configured to adjust a cell by changing to the calculated transmission power amount or the calculated radio wave directivity.

(Supplementary Note 9)

A cell adjustment method including:

acquiring position information of a base station;

directly or indirectly sharing the position information of the base station and state information including a transmission power amount and a radio wave directivity of the base station with one or more adjacent base stations, and acquiring position information of the adjacent base station and state information including a transmission power amount and a radio wave directivity of the adjacent base station;

deciding whether cell adjustment is necessary, based on position information of the adjacent base station, acquired state information of the adjacent base station, position information of the base station, and acquired state information of the base station;

calculating a transmission power amount or a radio wave directivity of the base station when it is decided that cell adjustment is necessary; and adjusting a cell by changing to the calculated transmission power amount or the calculated radio wave directivity.

(Supplementary Note 10)

A program causing a computer to execute:

acquiring position information of a base station;

directly or indirectly sharing the position information of the base station and state information including a transmission power amount and a radio wave directivity of the base station with one or more adjacent base stations, and acquiring position information of the adjacent base stations and state information including a transmission power amount and a radio wave directivity of the adjacent base station;

deciding whether cell adjustment is necessary, based on position information of the adjacent base station, acquired state information of the adjacent base station, position information of the base station, and acquired state information of the base station;

calculating a transmission power amount or a radio wave directivity of the base station when it is decided that cell adjustment is necessary; and adjusting a cell by changing to the calculated transmission power amount or the calculated radio wave directivity.

An example advantage according to the present disclosure is to provide a base station and the like being capable of suppressing interference with a radio wave of another base station.

What is claimed is:

1. A base station comprising:

a receiver configured to adopt time division duplex (TDD) and receive a positioning signal from a satellite positioning system, at least one memory storing instructions, and at least one processor configured to execute the instructions to;

acquire position information of the base station based on the positioning signal received via the receiver;

directly or indirectly share the position information of the base station and state information including a transmission power amount and a radio wave directivity of the base station with one or more adjacent base stations, and acquire position information of an adjacent base station of the one or more adjacent base stations and state information including a transmission power amount and a radio wave directivity of the adjacent base station;

decide whether cell adjustment is necessary, based on the position information of the adjacent base station, the state information of the adjacent base station, the position information of the base station, and the state information of the base station;

calculate a transmission power amount or a radio wave directivity of the base station when it is decided that cell adjustment is necessary; and adjust a cell by changing to the calculated transmission power amount or the calculated radio wave directivity, wherein the base station is a hand-carried type base station.

2. The base station according to claim 1, wherein the at least one processor is further configured to execute the instructions to; transmit, to the one or more adjacent base stations by broadcast, the state information of the base station together with an identifier of the base station, and acquire, from the adjacent base station by broadcast, the state information of the adjacent base station together with an identifier of the adjacent base station.

3. The base station according to claim 2, wherein the state information sharing is performed by using a random backoff algorithm.

4. The base station according to claim 1, wherein the at least one processor is further configured to execute the instructions to calculate a distance length between the base station and the adjacent base station, based on the position information of the base station and the position information of the adjacent base station.

5. The base station according to claim 1, further comprising a core, a radio unit (RU), a distributed unit (DU), and a central unit (CU), wherein the base station is a mobile base station operating according to a cellular communication standard.

6. The base station according to claim 1, wherein the at least one processor is further configured to execute the instructions to calculate a transmission power amount or a radio wave directivity of the base station by using a same cell adjustment algorithm as that of the adjacent base station.

7. A cell adjustment system comprising:

a base station; and an adjacent base station, wherein the base station includes a receiver configured to adopt time division duplex (TDD) and receive a positioning signal from a satellite positioning system, at least one memory storing instructions, and at least one processor configured to execute the instructions to; acquire position information of the base station based on the positioning signal received by the receiver, directly or indirectly share the position information of the base station and state information including a transmission power amount and a radio wave directivity of the base station with the adjacent base station, and acquire position information of the adjacent base station and state information including a transmission power amount and a radio wave directivity of the adjacent base station, decide whether cell adjustment is necessary, based on the position information of the adjacent base station, the state information of the adjacent base station, the position information of the base station, and the state information of the base station, calculate a transmission power amount or a radio wave directivity of the base station when it is decided that cell adjustment is necessary, and adjust a cell by changing to the calculated transmission power amount or the calculated radio wave directivity of the base station, wherein the base station is a hand-carried type base station, and the adjacent base station includes at least one memory storing instructions, and at least one processor configured to execute the instructions to;

acquire the position information of the adjacent base station, directly or indirectly share the position information of the adjacent base station and the state information including the transmission power amount and the radio wave directivity of the adjacent base station with the base station, and acquire the position information of the base station and the state information including the transmission power amount and the radio wave directivity of the base station, decide whether cell adjustment is necessary, based on the position information of the adjacent base station, the state information of the adjacent base station, the position information of the base station, and the state information of the base station, calculate a transmission power amount or a radio wave directivity of the adjacent base station when it is decided that cell adjustment is necessary, and adjust a cell by changing to the calculated transmission power amount or the calculated radio wave directivity of the adjacent base station.

8. The cell adjustment system according to claim 7, wherein the at least one processor of the base station is further configured to execute the instructions to transmit, to one or more adjacent base stations by broadcast, the state information of the base station together with an identifier of the base station, and acquire, from the adjacent base station by broadcast, the state information of the adjacent base station together with an identifier of the adjacent base station.

9. The cell adjustment system according to claim 8, wherein the state information sharing is performed by using a random backoff algorithm.

10. The cell adjustment system according to claim 7, wherein the at least one processor of the base station is further configured to execute the instructions to calculate a distance length between the base station and the adjacent base station, based on the position information of the base station and the position information of the adjacent base station.

11. The cell adjustment system according to claim 7, wherein the base station includes a core, a radio unit (RU), a distributed unit (DU), and a central unit (CU), and is a mobile base station operating according to a cellular communication standard.

12. The cell adjustment system according to claim 7, wherein the at least one processor of the base station is further configured to execute the instructions to calculate a transmission power amount or a radio wave directivity of the base station by using a same cell adjustment algorithm as that of the adjacent base station.

13. A cell adjustment method comprising:

adopting, by a receiver of a base station, time division duplex (TDD);

acquiring position information of the base station based on a positioning signal received by the receiver from a satellite positioning system;

directly or indirectly sharing the position information of the base station and state information including a transmission power amount and a radio wave directivity of the base station with one or more adjacent base stations, and acquiring position information of the adjacent base station of the one or more adjacent base stations and state information including a transmission power amount and a radio wave directivity of the adjacent base station;

deciding whether cell adjustment is necessary, based on the position information of the adjacent base station, the state information of the adjacent base station, the position information of the base station, and the state information of the base station;

calculating a transmission power amount or a radio wave directivity of the base station when it is decided that cell adjustment is necessary; and adjusting a cell by changing to the calculated transmission power amount or the calculated radio wave directivity, wherein the base station is a hand-carried type base station.

14. The cell adjustment method according to claim 13, wherein the state information sharing includes transmitting, to the one or more adjacent base stations by broadcast, the state information of the base station together with an identifier of the base station, and acquiring, from the adjacent base station by broadcast, the state information of the adjacent base station together with an identifier of the adjacent base station.

15. The cell adjustment method according to claim 14, wherein the state information sharing is performed by using a random backoff algorithm.

16. The cell adjustment method according to claim 13, wherein the calculating further includes calculating a distance length between the base station and the adjacent base station, based on the position information of the base station and acquiredthe position information of the adjacent base station.

17. A non-transitory computer readable medium storing a program causing a computer to execute the cell adjustment method according to claim 13.

* * * * *